United States Patent [19]

McLandrich

[11] 4,377,403

[45] Mar. 22, 1983

[54] METHOD OF FABRICATING A FUSED SINGLE-MODE FIBER BIDIRECTIONAL COUPLER

[75] Inventor: Matthew N. McLandrich, Oceanside, Calif.

[73] Assignee: The United States of America as represented by the Secretary of the Navy, Washington, D.C.

[21] Appl. No.: 191,563

[22] Filed: Sep. 29, 1980

[51] Int. Cl.³ .................... C03B 37/14; C03C 25/06
[52] U.S. Cl. ............................. 65/3.11; 65/4.21; 65/31
[58] Field of Search .......... 65/3.11, 4.21, 31; 350/96.15

[56] References Cited

U.S. PATENT DOCUMENTS 4,049,414 9/1977 Smith ................................ 65/4.21
4,124,364 11/1978 Dalgoutte ........................ 65/4.21
4,291,940 9/1981 Kawasaki et al. ............ 350/96.15

FOREIGN PATENT DOCUMENTS 55-4021 1/1980 Japan .......................... 350/96.15

*Primary Examiner*—Richard V. Fisher
*Attorney, Agent, or Firm*—Robert F. Beers; Ervin F. Johnston; Thomas Glenn Keough

[57] ABSTRACT

An improvement for the coupling of optical energy in a single-mode fiber assures a stable bidirectional coupling. A method of fabricating a single-mode evanescent field coupler for optical data between two single-mode fibers calls for there first being an etching away of a substantial portion of the claddings about the cores of both single-mode fibers. This etching calls for the immersion of sections of the fibers in an etching solution for a predetermined time with the ends of the exposed sections being carefully masked to create smooth, unscored, tapered transitions. The etched sections of the single-mode fibers are placed in a side-by-side relationship, are longitudinally twisted about each other to assume a closely abutting helical disposition and are secured in place at their ends. A pair of tungsten electrodes are brought into the close proximity of the twisted etched fibers and an arc is initiated. Moving the electrodes along the length of the twisted etched fibers causes the arc to fuse them together to assure a stable configuration and, hence, stable evanescent field coupling. Once the fibers have been fused, a protective envelope encases the fused twisted fibers and it is filled with a liquid having the same index of refraction as the fibers' claddings. Thus, a stable coupler is created that is isolated from outside thermal and mechanical influences.

9 Claims, 6 Drawing Figures

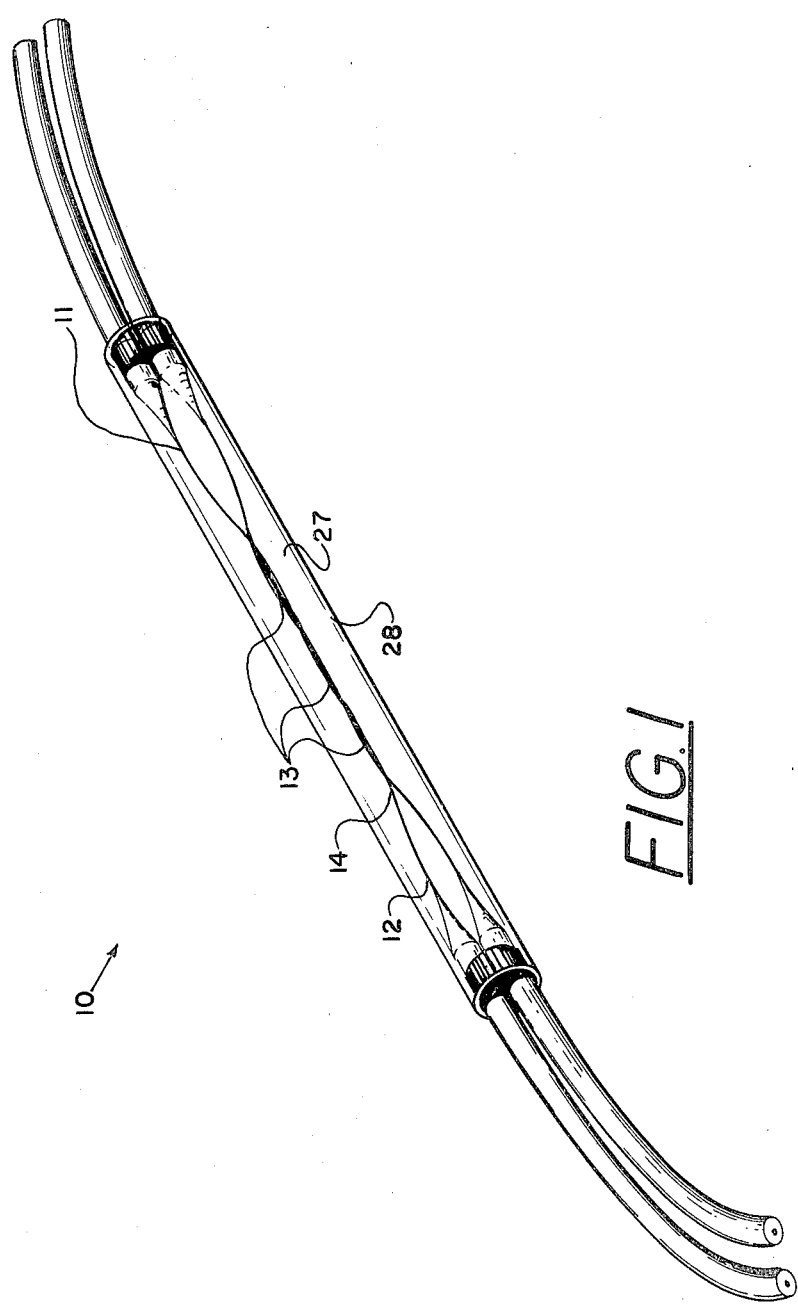

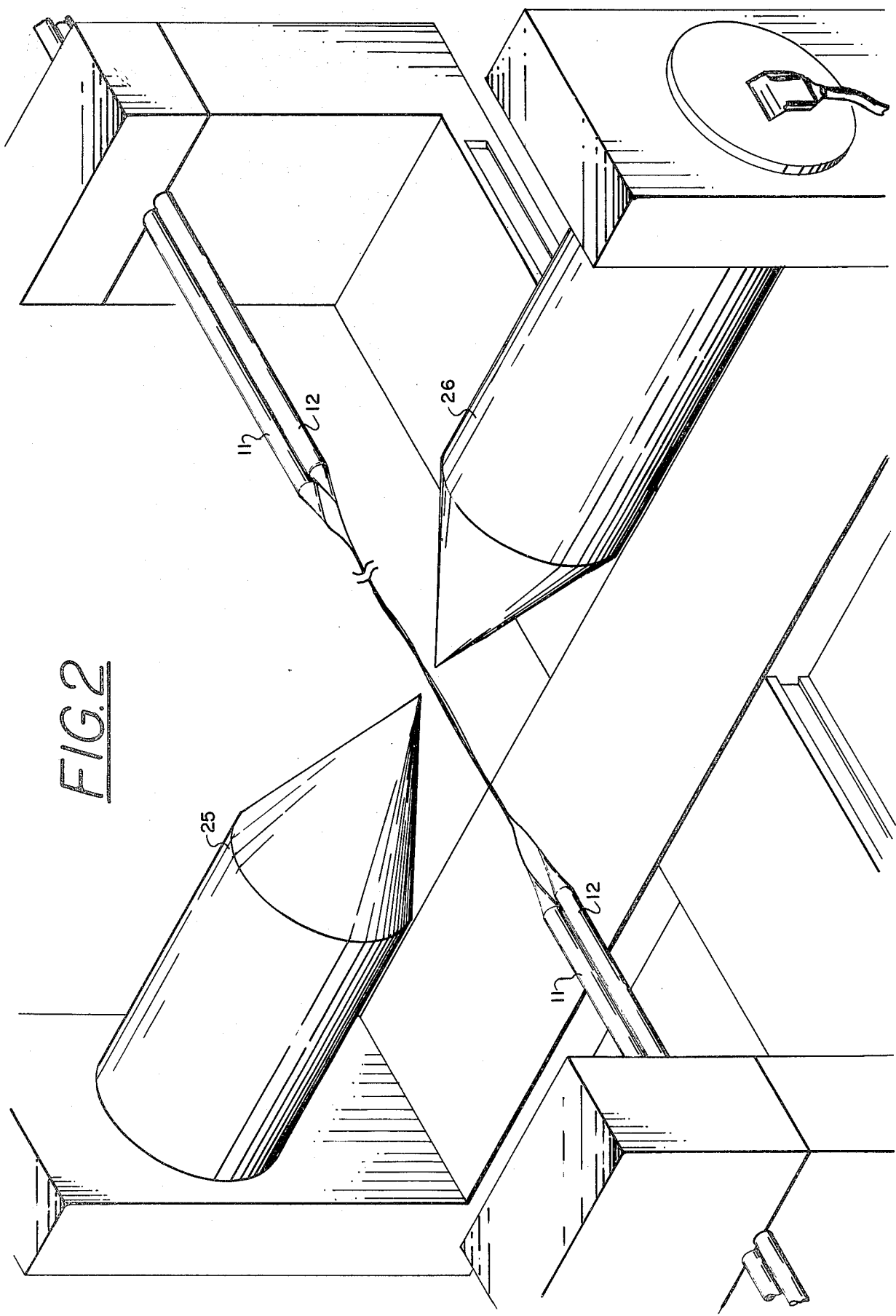

METHOD OF FABRICATING A FUSED SINGLE-MODE FIBER BIDIRECTIONAL COUPLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Old methods of fabricating single-mode fiber couplers involve positioning of fibers which have had their claddings stripped away and then surrounding the etched fibers with an index-of-refraction matching liquid. Typically, the amount of cladding which remains is about one-half the core diameter and the length of the etched region is in the neighborhood of two centimeters. Optionally, the fibers can be twisted together, disposed in an index matching fluid and held in place by mechanical fasteners. This approach, while meritoriously providing a somewhat acceptable degree of coupling, is prone to fail if the index matching liquid leaks away, if vibrations separate the twisted fibers or if a combination of the two occurs. An alternate approach, of course, is to align a pair of etched fibers and hold them together by collapsing a glass capillary tube about them, but this too has drawbacks.

Because of the limitations and the disadvantages of both the described methods, they leave much to be desired from a designer's standpoint. An acceptable low-loss stable coupler must have the index of refraction of the surrounding medium exactly match that of the claddings and the relative positioning of the etched fiber regions must be strictly maintained to within a very small (less than one micron) range. The first referred to method relies on purely mechanical means to align the fibers and, consequently, is not stable; when external disturbances such as vibrations and temperature changes occur, they cause movement of the mechanical fasteners and, hence of the fibers themselves, to degrade the coupler's stability. The second referred to method has two obvious limiting requirements, those being, that the mechanical and thermal properties of the capillary tube must match those of the glass fibers. When mismatch occurs, either or both the fibers and capillary tubes will crack and become misaligned as they are heated to and cooled from glass's melting temperature. Additionally, when the glass capillary tubes are expected to serve as a cladding-index matching medium, it is very difficult to match the refractive indices to within 0.1% (needed for acceptable single-mode coupling). Identical temperature coefficient and refractive index matching are nearly an impossibility in a practical sense.

A more recent advance is disclosed by Michael K. Barnoski et al. in their "Fiber Optics Access Coupler" U.S. Pat. No. 4,054,366. Their coupler is intended to be used in single strand multimode fiber systems calling for a variety of optical inputs and outputs. Laser beams are used to fuse couplers in a juxtaposed relationship. The coupling largely is dependent on the distance the cores are separated and the length that the cores are held in their side-by-side positioning. The degree of coupling for any given angle between the fibers when they are joined is dependent on the angle they make at the junction between them and the modes that have been excited in the waveguide. Some modes couple more energy into the access fiber primarily because they make a greater propagation angle with respect to the access coupler. The core diameters are in the range of thirty to one-hundred microns and the overlying claddings are between twelve to one-hundred microns. These dimensions along with the specification assure that Barnoski et al.'s multimode transmission and, hence, maintaining phase relationships are not anticipated. The coupling between the fibers is dependent on a fused cladding-on-cladding and a typical coupling efficiency is disclosed as being nearly eight percent. Thus, by design or by consequence multimode and multiphase coupling at low efficiencies are inherent in the Barnoski et al. coupler.

Thus, there is a continuing need in the state of the art for a coupler of optical data which lends itself toward coupling single-mode, in-phase signals between small, single-mode conductors. The coupler must be capable of withstanding environmental abuses such as temperature changes and mechanical influences, and still effect a reliable transfer of energy between adjacent fibers.

SUMMARY OF THE INVENTION

The present invention is directed to providing a method of fabricating a single-mode evanescent coupling of light between two single-mode fibers having outer diameters of approximately one-hundred microns. First, the method calls for the etching away of a substantial portion of the cladding about the cores of each of the single-mode fibers along predetermined lengths. The wax masking of the fiber and immersion in an etching fluid a predetermined period assures that the tapered transition lengths between etched and unetched areas are smooth and defect free. Next, there is a placing of etched lengths in a side-by-side relationship and a twisting of the etched lengths longitudinally about each other to assume a closely abutting helical disposition. Next, there is a securing of the ends of the etched, longitudinally twisted fibers to maintain their closely abutting helical relationship and a fusing of the longitudinally twisted etched lengths together in the closely abutting helical shape to assure the desired evanescent coupling which, optionally, can be a three dB evanescent coupling of single-mode energy. The step of etching away of the cladding includes the inserting of the fibers through appropriately sized openings in a container and flowing a sealant, such as beeswax, about the fibers until it hardens to prevent the etching solution from irregularly eating away the cladding beyond the nonreactive sealant. After a predetermined time, the etching solution is discarded and a smooth tapered transition is created that reaches from the fiber where it is protected by the nonreactive sealant to the exposed portion of the fiber within the etchng solution. The twisted, etched and fused fibers are encased in a protective sheath which is, in turn, filled with a fluid having a refractive index that substantially matches that of the claddings to thereby assure a more reliable single-mode evanescent transfer of energy.

It is a prime object of the invention to provide a method allowing the coupling of single-mode fibers.

Still another object of the invention is to provide a method for assuring the evanescent coupling of single-mode energy between single-mode fibers.

Still another object of the invention is to provide a coupling for single-mode fibers that resists the environmental effects of temperature change and mechanical disturbances.

Still another object of the invention is to provide for a method of fabricating a single-mode evanescent coupling relying upon the selective etching of cladding, the placing of etched lengths together, the twisting and the fusing of the twisted, etched lengths to resist the ambient effects.

Still another object is to provide a method of fabricating a single-mode coupling calling for the holding of longitudinally twisted longitudinal fibers between a pair of electrodes and initiating an arc between the electrodes to effect the fusing.

Still another object is to provide for a method of fabricating an evanescent coupling between single-mode fibers that is cost effective and commercially feasible.

A further object is to provide a method of mounting fibers in an etching vessel which provides a smooth fiber etch without defects at the transition between etched and unetched regions thus resulting in an etched fiber with high strength and corresponding ease of handling during the fabrication process.

These and other objects of the invention will become more readily apparent from the ensuing description and claims when taken with the drawings.

BRIEF DESCRIPTION OF THE DRAWINGS

FIG. 1 depicts a representative embodiment of the invention.

FIG. 2 schematically shows the fusing of longitudinally twisted fibers together.

FIGS. 3a and 3b depict steps in the process of etching the single-mode fibers while

DESCRIPTION OF THE PREFERRED EMBODIMENT

Figure 3C:
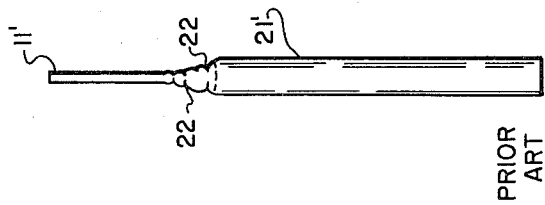
FIG. 3c shows a tapered scored, transition improperly fabricated by conventional approaches.

Referring now to the drawings, a coupler 10 fabricated in accordance with the teachings of this invention has the capability for bidirectionally passing meaningful data transmitted in the single mode. Transmission of information in the single mode is necessary for some highly sophisticated applications, one of which being, a fiber interferometer which requires that the phase relationships between counterrotating beams not be compromised by the optical circuit components (the lasers, detectors and the optical couplers).

This method of fabricating of the optical coupler assures that phase relationships are not overly compromised as single-mode energy is transferred by an evanescent coupling between adjacent fibers. A pair of single-mode fibers 11 and 12 are constructed in accordance with well accepted techniques so that the outer dimension of the cladding is approximately one-hundred microns and the core diameters are in the neighborhood of four to ten microns.

The cladding is etched away over a length where coupling is to occur. Usually, only a fraction of the cladding is allowed to remain on the cores so that the wrapped turns 13 of fiber together have a diameter of about twenty to thirty microns along their etched lengths 14.

The fibers are longitudinally twisted together forming the several turns so that an evanescent transfer of energy passes between the fibers via the thin layers of cladding allowed to remain on the outsides of etched portions 14 of the fibers. After the twisted fibers are held together, they are arc-fused together. Because of the small size of the single mode fibers, the etched, twisted, and fused together fibers are usually protected to a degree from physical abuse by a sheath 27 (transparent glass or an opaque material); the outer diameter of the sheath and contained fibers is in the neighborhood of approximately three millimeters.

Opposite ends of the sheath containing the etched, twisted and fused fibers are plugged so that the sheath can be filled with a fluid 28 having a refractive index which, as closely as possible, matches that of the claddings. Having the fluid surrounding the etched, twisted and fused fibers enhances the evanescent coupling of single-mode energy between the fibers.

The evanescent coupling phenomena referred to above is firmly established in the art. An optical energy transfer occurs between adjacent fibers lying adjacent a predetermined length while being separated by a predetermined distance. Just how much energy is transferred, at what frequencies or at what modes the energy is transferred from core to core and how it passes through both fibers' claddings are matters that are understood and are routinely calculated and performed by those skilled in the art to which this invention pertains. A further discussion regarding the phenomena of evanescent coupling, the physical parameters involved, etc., are set forth by N. S. Kapany and J. J. Burke in the text "Optical Wave-guides," Academic Press, 1972.

A single-mode optical coupler described above helps to assure that the fiber interferometer functions more reliably. This inventive concept addresses itself toward enabling the desired coupling needed for fiber interferometer operation; however, this effort also provides for increased resistivity to the ambient effects of temperature variations and mechanical influences which might otherwise limit the usefulness of lesser optical couplings.

The one-hundred micron outer diameter single-mode fibers used to transmit meaningful data are extremely small and delicate to say the least. Great care must be taken when handling these fibers individually and fabricating a coupler requires an even increased awareness of the disastrous consequences of damage. Individual fibers, therefore, must be treated carefully to assure a more reliable coupling.

Figure 3B:
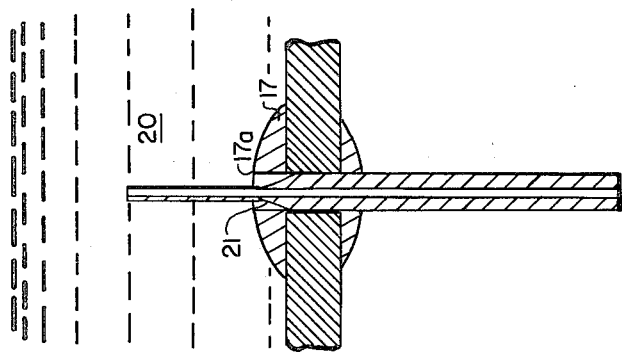
Figure 3A:
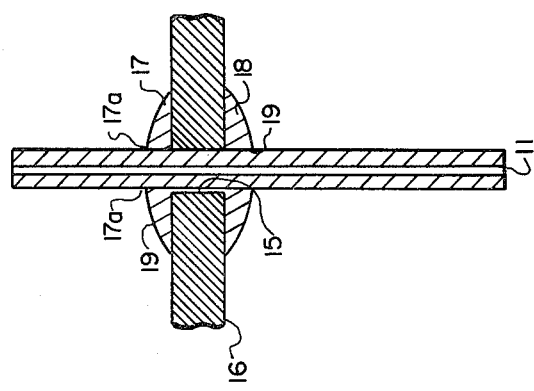

Looking to FIG. 3a through 3c a fiber 11 to be used in a single-mode coupler is inserted through an opening 15 in the wall of a container 16. A nonreactive sealant such as beeswax 17 is melted either in a crucible or in the stream of a hot air dryer so that it flows into the opening and around the fiber. After the melted beeswax hardens, it assumes the shape of a uniform annulus 17 and 18, above and below the wall along with an interconnecting, integrally formed cylindrically shaped plug 19 where the melted wax flowed into the opening in the container wall and about the fiber.

FIG. 3a shows that annulus 17 creates a smooth, continuous line of transition 17a where it abuts the outer surface of fiber 11. Because the outer surface of the fiber was washed clean with a suitable solvent to remove any surface impurities, the exposed line of juncture between the fiber and annulus 17 is a smooth continuous ring. Surface tension and capillary action shape the wax in this uniform ring 17a to have either an acute or obtuse cross section, but in either case, the ring-shaped juncture 17a is smooth and continuous about its edge to restrict the exposure of the fiber to an etching solution 20.

The exact composition of the etching solution is a matter of choice, as well as its state. A hydrofluoric solution of variable concentration has been used with an appreciable degree of success. This enables a precise, continuous etching away of the cladding material until only a few microns, no greater than twenty microns, remain about the cores to assure that the evanescent coupling can occur.

Noting FIG. 3b, after a predetermined time, the cladding about the core is etched away along the length of the fiber where it has been in contact with the etching solution. Inside of annulus 17, the solution has etched away the cladding of the fiber so that the etched fiber has a tapered cross-sectional configuration 21 and its outer surface is smooth and continuous. There are no breaks; there are no defects of the etched exposed surface along the taper.

Heretofore, it has been the experience of designers that a series of fractures or small scores are created when the fibers were dipped into a vat of the etching solution, or similarly exposed to etching vapors, see FIG. 3c. The Figure is an actual representation of a microphotograph of a dip-etched fiber 11' showing several scores 22 along a tapered section 21'. The areas of the etching solution-air interface where this fiber along with others made the transitions from air to the solution were invariably scored substantially as shown. Although the exact nature of this phenomenon is not clear, it is believed that the small hair-line, albeit microscopic, cracks that scored the tapered section apparently were caused by a fuming action at the vapor/liquid line. The small scores and cracks weakened the fibers and they failed in this area repeatedly. In contradistinction, the process of etching described above and depicted in FIGS. 3a and 3b created a smooth, continuously tapered section that was not prone to failure and which created a strong reliable coupling after the fibers were twisted together and fused.

Twisted the scored and tapered fiber, such as that shown in FIG. 3c, would nearly always result in failure in the tapered section. As mentioned above, these failures apparently were caused by the scores created by the dip-etching away of the cladding. The controlled, masked-with-wax approach of FIGS. 3a and 3b produced no failure prone sections.

A pair of the fibers 11 and 12 having their claddings etched away with tapered sections as outlined above would be twisted together over an approximately two-centimeter length with between three to ten turns and held between a pair of holders 23 and 24. Two tungsten electrodes 25 and 26 are positioned about three of four millimeters outside of the twisted fibers and a few thousand volt potential is applied across the electrodes. Arcing between them heats the cladding still remaining on the etched twisted fibers to its melting point. Further heating by the arc fuses the claddings together and, after cooling, physically and optically couples the fibers together. Since the electrodes are displaced longitudinally along the longitudinally twisted fibers at a rate to assure fusing of the claddings and not the cores, the fusing continuously progresses so that a helically-shaped, twisted, fused interconnection is created between the two fibers.

After the fibers are joined together by fusing, a protective sheath 27 is placed about them and is filled with a liquid 28 having a refractive index which matches that of the claddings. Opposite ends of the protective sheath are plugged. The plugs also tend to hold the fibers together as an integral unit.

Figure 4:
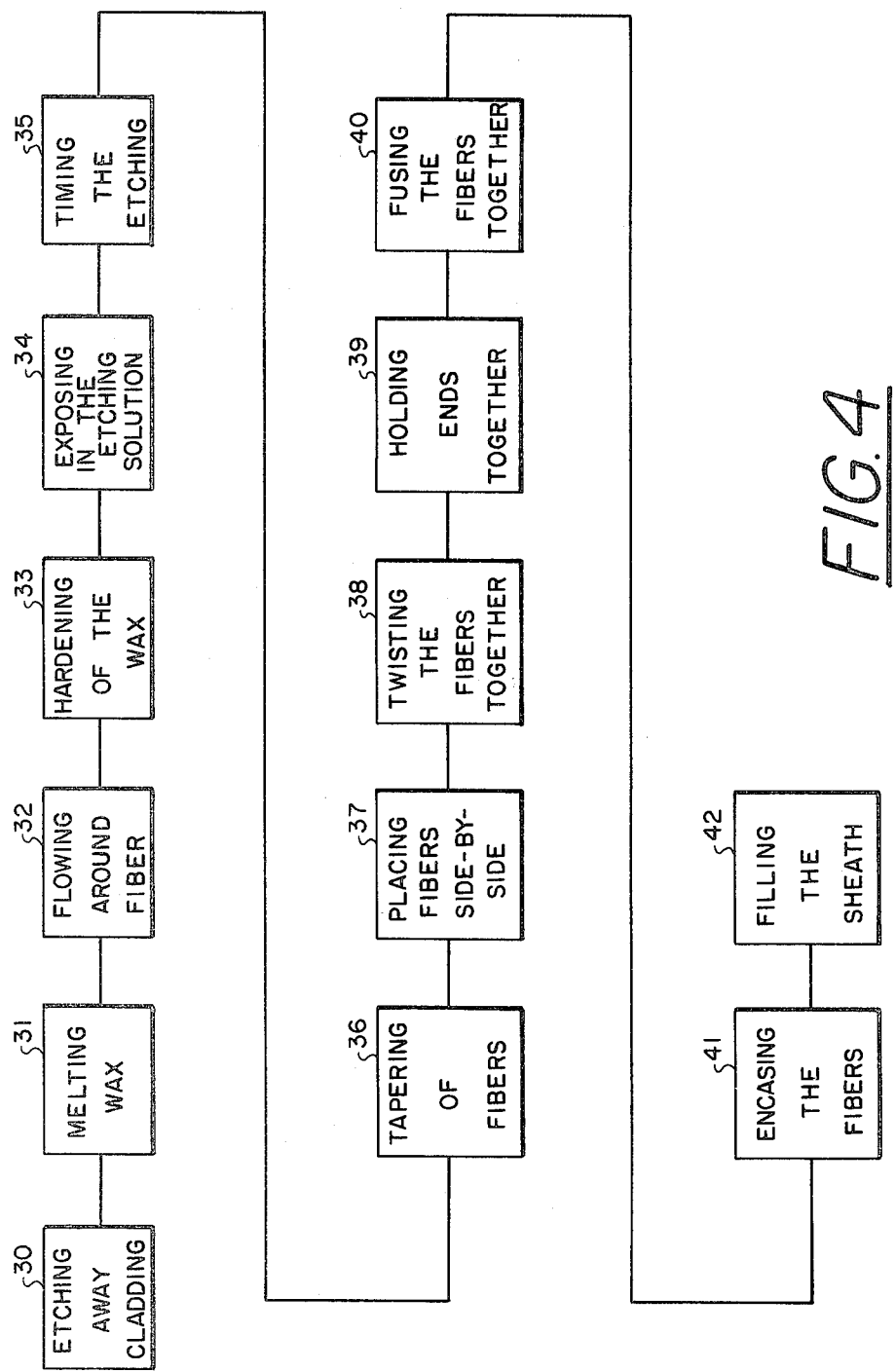
FIG. 4 is an expression of the coupling of single-mode fibers according to the method of this invention.

Referring to FIG. 4, the method of the invention calls for there being an etching 30 away of the cladding about both of the fibers by there first being a melting 31 of a nonreactive sealant such as wax that flows and plugs an opening through which a fiber has been inserted. The flowing 32 around the fiber provides a smooth, continuous ringed-shaped juncture where the wax joins the outer surface of the fiber after the hardening 33 of the wax. The exposed fiber and annulus of the hardened wax are exposed 34 to an etching solution which may be a hydrofluoric solution that etches away the cladding of the fiber. Timing 35 the etching process assures that the right amount of cladding is etched away so that the evanescent coupling between fibers can occur. In addition, the timing of the etching of the wax prepared fiber assures that a tapering 36 of the fiber is smooth and continuous so that no hairline fractures or scores are created which would otherwise compromise the structural integrity of the fiber.

Placing 37 the fibers side-by-side assures that the proper coupling of energy might occur and the twisting 38 of the fibers brings them closely together in a helically abutting relationship. After holding 39 of the fiber ends together, a longitudinal fusing 40 of the claddings links the fibers in a close mechanically interlocked relationship to assure the evanescent coupling. Further protection for the coupling calls for the encasing 41 of the fibers in a protective sheath. This sheath can be transparent, opaque, flexible or rigid to further protect the fibers and, when there is the filling 42 of the sheath with a liquid having the same refractive index as the fibers' claddings, a coupling between the fibers is enhanced.

Obviously, many other modifications and variations of the present invention are possible in the light of the above teachings. It is therefore to be understood that within the scope of the appended claims the invention may be practiced otherwise than as specifically described.

What is claimed is:

1. A method of fabricating a single-mode evanescent coupling of light between two single-mode fibers each provided with a cladding having an outer diameter of approximately one-hundred microns and enclosing a core, comprising:

etching away a substantial portion of the cladding about the core of each single-mode fiber along a predetermined length, wherein the step of etching includes exposing the fibers in a hydrofluoric acid solution a sufficient period of time to etch away a sufficient amount of the claddings to assure the evanescent coupling of light, the step of etching includes the inserting of each of the fibers through an opening and the exposing of the inserted portions of the fibers to the etching solution and the etching includes the wax-masking of the fibers where they are inserted into being exposed to the etching solution to present a continuous smooth transition into the etching solution;

placing the etched lengths in a side-by-side relationship;

twisting the etched lengths longitudinally about each other to assume a closely abutting helical disposition;

securing the ends of the etched longitudinally twisted fibers to maintain their closely abutting helical relationship; and fusing the longitudinally twisted etched lengths together in the closely abutting helical shape to assure the evanescent coupling.

2. A method according to claim 1 in which the wax-masking is done by melting beeswax causing it to flow through the opening through which each of the fibers is inserted and around each of the fibers.

3. A method according to claim 2 in which the melting causes the wax to flow along the fibers and harden in a smooth transition line so as not to create scores and cracks during the etching process.

4. A method according to claim 3 further including:
encasing the etched, longitudinally twisted and fused fibers in a protective sheath and filling the protective sheath with a fluid having a refractive index that substantially matches the claddings' index of refraction.

5. A method according to claim 4 in which the step of placing and longitudinally twisting involves etched fibers of approximately two centimeters in length.

6. A method according to claim 5 in which the step of twisting is the helical interleaving of the fibers of between three to ten turns along the two centimeter length.

7. A method according to claim 6 in which the step of fusing includes locating the etched longitudinally twisted fibers between a pair of electrodes and initialing an arc between them.

8. A method according to claim 7 in which the step of fusing includes separating a pair of tungsten electrodes a distance of nearly two millimeters and initialing an arc between them.

9. A method according to claim 8 in which the step of fusing further includes longitudinally displacing the arcing tungsten electrodes along the etched longitudinally twisted fibers at a predetermined rate to assure fusing of the claddings and the evanescent coupling.

* * * * *